UNITED STATES PATENT OFFICE.

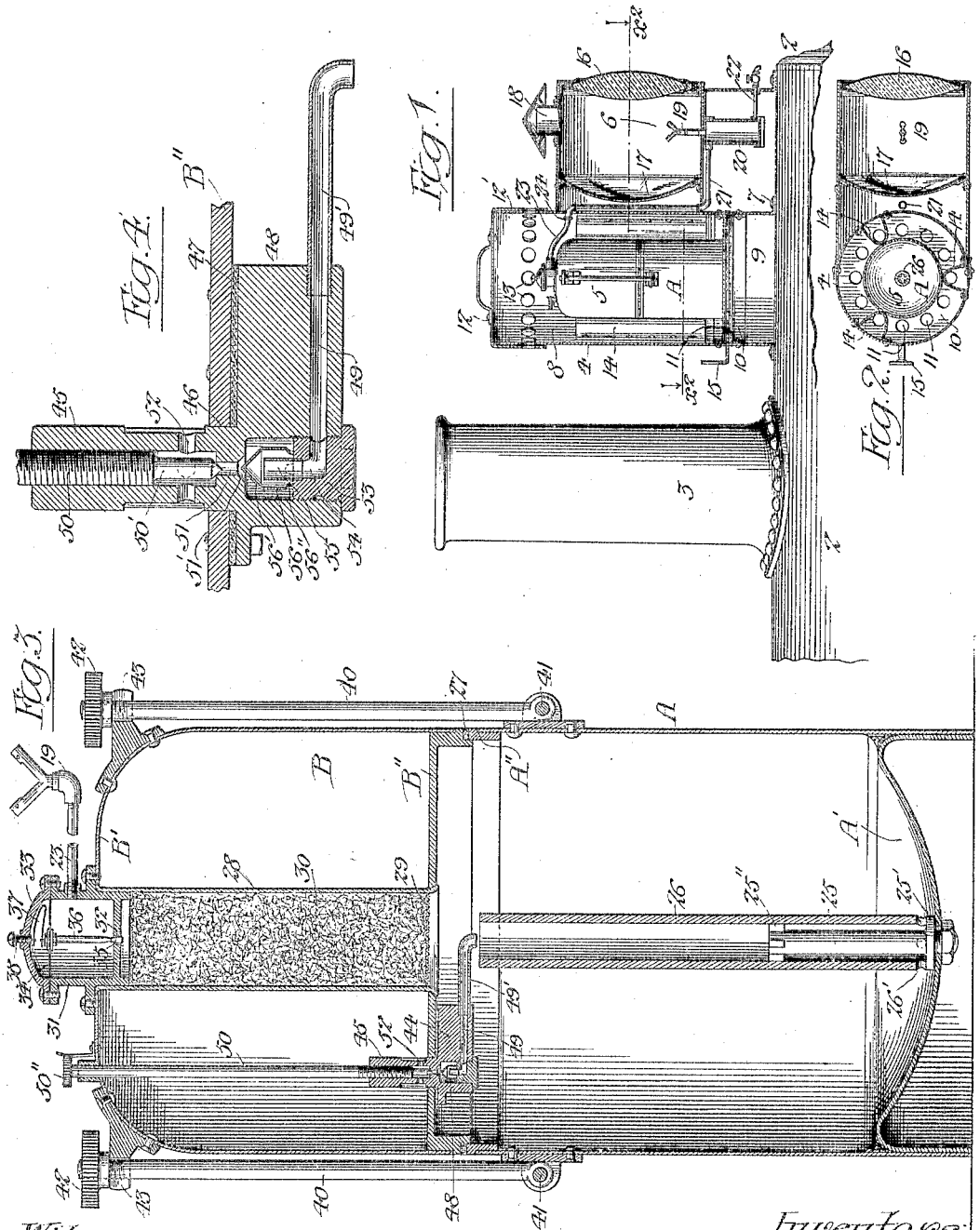

GEORGE H. EMERSON, ROBERT D. HAWKINS, AND FREDERICK T. KITCHEN, OF ST. PAUL, MINNESOTA.

ACETYLENE-GENERATOR FOR LOCOMOTIVE-HEADLIGHTS.

No. 802,379. Specification of Letters Patent. Patented Oct. 24, 1905.

Application filed June 13, 1904. Serial No. 212,332.

*To all whom it may concern:*

Be it known that we, GEORGE H. EMERSON, ROBERT D. HAWKINS, and FREDERICK T. KITCHEN, residents of St. Paul, in the county of Ramsey and State of Minnesota, have invented certain new and useful Improvements in Locomotive-Headlights, of which the following is a specification.

Our invention relates to improvements in headlights generally, and has special reference to locomotive headlights or lamps.

It relates particularly to improvements in acetylene-gas apparatus and to the utilization thereof in the form and place of a headlight upon a moving vehicle, such as a locomotive.

The various objects of our invention, in its broad aspect, and the manner of attaining said objects will appear herefrom; but, as the preferred use of our invention is as a locomotive-headlight, our objects and invention will be set forth in that connection. Hitherto railroad-trains have been lighted by acetylene gas, and it has been proposed to employ that gas in locomotive-headlights; but in every instance with which we are familiar the difficulty of attending such use has caused the abandonment of the experiment and the apparatus which it was proposed to use. Compressed gas has been deemed too dangerous for employment upon a locomotive, and the acetylene-gas generators that have been placed on locomotives or tenders have given much trouble, chiefly because of the extended piping and from freezing in cold weather.

The special objects of this invention are to provide an acetylene-gas headlight of great capacity and power, to effectually protect the gas-generating apparatus against freezing, and to provide a headlight which shall comprise two parts in close compact arrangement and which shall together occupy the place and position of the ordinary headlight.

Another object of the invention is to provide a headlight of such construction that its gas-generator may at any time be removed and replaced by another.

Still another object is the provision of apparatus that may be located upon the front end of the locomotive and shall not require care or attention on the part of the locomotive-engineer.

Further and particular objects are to provide a simple strong acetylene-gas headlight capable of withstanding the shocks and the vibrations to which a headlight is subjected, which shall be entirely automatic in operation, and which will be entirely safe under all conditions.

Our invention consists, broadly, in the combination of a locomotive-boiler with an acetylene-gas generator and lamp, located upon the "front end" of said boiler and receiving sufficient heat therefrom to prevent freezing; and, further, our invention consists in a generator-holder thus located, in combination with a lamp forming part of such structure, and a generator arranged in said holder and readily removable therefrom; and our invention also consists in various and special constructions and combinations of parts, all as hereinafter described, and particularly pointed out in the claims.

The invention will be more readily understood by reference to the accompanying drawings, forming a part of this specification, and in which—

Figure 1 illustrates our locomotive-headlight upon the front end of a locomotive-boiler. Fig. 2 is a horizontal section on the line $x^2 x^2$ of Fig. 1. Fig. 3 is an enlarged vertical section of our generator, and Fig. 4 is still another enlarged detail of the water-regulating valve which governs the generation of gas.

In the drawings, 2 represents the front end of the locomotive-boiler. Our headlight is preferably located on said end in front of the stack 3. It represents the generator holder shell or casing, and 5 is the generator, and 6 the lamp. The casing 4 is preferably cylindrical and is provided with a flange 7 at its lower end, which is riveted to the top of the boiler-shell. The casing 4 is divided into upper and lower parts 8 and 9 by a horizontal floor 10 to support the generator. This floor has a number of openings 11 for admitting air to the generator from the hot chamber or space 9. The upper end of the holder or casing 4 is closed by a cap or cover 12, having a deep flange 12'. This flange and the upper part of the holder 4 are provided with a number of holes or perforations 13, which may be brought into register or closed, as desired, by turning or twisting the cover 12 on the top of the holder 4. The generator 5 is preferably cylindrical and is held centrally in the casing 4 by three or more vertical ribs 14, provided by the inner walls of the casing. 15 represents a perforated damper or regulator in the floor 10 for shutting off or turning on or regulating the supply of warm air from the chamber 9. In warm weather the damper 15 is closed, while the top damper-cover 12 is opened. At other times the dampers are adjusted, according to the temperature of the atmosphere, to retain part or all of the heat rising from the front end of the locomotive, and thus prevent the freezing of the water in the generator. The lamp-body 6 preferably comprises a sheet-metal cylinder fitted and attached to the front of the holder 4. The forward end of the body is closed by a hinged door containing a lens 16 for concentrating the rays of light. A suitable reflector 17 is also provided in the lamp-body, and 18 represents the hood of the lamp. The burner 19 is located in the lower part of the lamp-body and is fed from a small moisture-collecting well or pocket 20 beneath the lamp-body. The gas-supply pipe 21 is connected to the upper part of the pocket 20, and a suitable drain-cock 22 is provided at the bottom of the pocket for drawing off the liquid residue and other impurities which collect therein.

As shown in Fig. 1, the gas-pipe 21 leads upwardly behind the reflector 17 and enters the casing 4 at a point opposite the top of the generator 5. It is joined to the generator preferably by a flexible tube 23, the tube and pipe being connected by means that will permit of their easy disconnection—such, for example, as the union 24. When the pipe and tube are disjointed, the generator may be lifted out of the shell or casing 4 and either refilled or replaced by another. As represented in the drawings, we prefer to embody our invention in a simple cylindrical two-part body. The lower part A is for calcium carbid, while the upper part B is a valved water-reservoir and has associated with it a filter or drier and a gas-regulating valve. It will be noted that the several minor parts, which are necessary or essential to each part A B of the generator, are constructed therein or attached thereto in such manner that the minor parts of the apparatus are not disturbed and do not require manipulation when the upper part of the generator is removed from the lower part. Said lower part comprises a cylinder having a preferably concave bottom A' and finished at the top by a packing ring or flange A". In the bottom of the carbid-receptacle is a post 25, provided with a bottom flange 25'. The post holds a water-feed tube 26, having a number of outlet-holes 26'. The removable water-reservoir or part B is cylindrical and has a top B' and a bottom B". The latter is preferably a casting provided with a flange and groove for the packing 27, which fits on the ring or flange A" of the lower part A.

The parts A and B are held together by the long rods or bolts 40. These bolts are pivoted upon ears 41 on the carbid-receptacle, and their upper ends are provided with milled nuts 42 to engage the slotted lug 43 on the top of the water-receptacle. Upon loosening the nuts 42 the bolts may be thrown down and the water-reservoir or upper part of the generator removed. When the two parts of the generator are fastened together, the nuts 42 serve as handles for lifting the generator in and out of the casing or holder 4. The bottom B" and the top B' are provided with central openings, and in these we lightly fit a smaller cylinder or tube 28. This is preferably of sheet metal, and its ends are suitably joined to the top and bottom of the water-receptacle. The lower end of the cylinder 28 opens save for a screen or netting 29, and the cylinder is filled with suitable filter and drying material 30, it being intended that the gas generated in the lower part A shall escape through the central tube 30 and be therein freed from moisture and impurities. Within or at the upper end of the central tube or cylinder 28 is a regulating or reducing valve, comprising a small cast-metal pot 31, fitted in 28 and suitably secured on the top of the generator. The bottom of the part 31 is provided with a valve-opening 32, and the top thereof is closed by a cap 33.

34 represents an elastic or flexible diaphragm bound between the flanges of the parts 31 and 33.

35 represents a valve to close the gas-outlet opening 32 and having its stem 36 attached to the diaphragm 34. Above the diaphragm and within the cap 33 is a small bow-spring 37, and 38 is a screw in the cap 33, by which the pressure of the spring 37 upon the diaphragm may be adjusted. The flexible gas connection or tube 23 leads from the regulator-pot 31.

The novel water-regulating valve of our invention preferably takes the form of valve-block 44, having a vertical part 45, which extends through an opening 46 in the bottom B". Suitable packing material 47 is arranged between the blocks 44 and the bottom B", and said block is bolted to said body. Any need to closely fit the part 45 in the bottom B" is avoided by this construction. The valve-block contains a valve-chamber 48 in its lower part and also a duct 49. The upper part of the block is bored out to receive the valve-stem 50, and the upper and lower parts communicate by a small valved opening 51, adapted to be closed by the reduced end 50' on stem 50. The part 45 of the block is provided with a number of holes 52 at points above the bottom B" to admit water to the valve. The stem 50 is threaded within the part 45 and extends through the top of the water-reservoir, being there provided with a hand-wheel 50". The lower end of the chamber 48 is closed by a plug 53, having a central opening 54, which communicates with the duct 49. On the plug 53 is a small vertical tube or riser 55. 56 represents a light bell or inverted cup, preferably made of aluminium. This normally rests upon the top of the plug and is provided with a conical top 56' at the lower end of the valve opening or duct 51. The lower end of the valve-bell is provided with serrations or openings 56'', whereby water which flows into the cavity 48 through the duct 51 may rise within the bell and overflow the riser 55. Water which thus finds a passage through the valve is conducted to the central tube 26 of the carbid-receptacle through passage 54, duct 49, and the light pipe extension or nozzle 49', which latter overhangs the top of the tube 26. The reservoir B is filled with water through an opening (not shown) in its top.

The operation of our invention is as follows: The milled nuts 42 of the generator are first loosened, and the part or reservoir B is removed from the lower part A. The parts are then filled with water and calcium carbid, respectively, and the upper part is set back in place and secured by the fastening of bolts 40. The cover 12 of the generator-holder 4 is then taken off and generator is placed in the holder, and its flexible tube 23 is joined to the gas-pipe 21, leading to the burner 19. When this has been done, the valve-stem 50 is turned to open the water-valve, whereupon the water will immediately begin to flow through the valve-block and into the water-tube 26 of the carbid-receptacle. The water on leaving the lower end of said tube through holes 26' attacks the calcium carbid and gas is generated in the closed receptacle. The gas rises through the filter 28 and passes through valve-openings 32 into the reducing-valve pot and thence to the burner 19. The spring of the reducing-valve is adjusted to a certain diaphragm-pressure, and the valve 35 will only be closed when that pressure is exceeded. The reducing-valve has sufficient gas capacity to maintain the supply of gas to the burner for some time, and hence there is no danger of extinguishing the lamp when the reducing-valve is momentarily closed by excessive pressure. The reducing-valve will again open as soon as the pressure in the valve-pot is depleted by the flow of gas through the headlight-burner. It will be understood that the water-regulating valve is constructed to furnish ample water to the carbid and that to avoid excessive pressure in the carbid-receptacle it is necessary to shut off the supply of water when the pressure therein more than slightly exceeds the pressure to which the reducing-valve responds. This is the office of the automatic water-regulating valve above described. It will be observed that the use of the riser 55 in the valve-chamber 48 provides an annular space within which the valve-bell 56 is normally immersed. During the normal flow of water the bell simply serves to render the passage tortuous; but as soon as the regulating-valve 35 closes and the pressure of gas in receptacle A increases the back pressure of said gas through the duct 49 will operate to lift the bell 56 and drive its top snugly against the seat 51', thereby shutting off the supply of water. This results from the trapping of a small quantity of gas or water in the top of the bell-valve. We find this valve to be extremely sensitive and reliable and that it not only affords accurate water regulation, but also effectively prevents the backflow of gas from the carbid-chamber into the water-reservoir. When the generator has been started in this manner, the cover 12 of the holder and the damper or regulator 15 are adjusted to provide the necessary supply of heat from the locomotive-boiler shell to the holder, and nothing then remains to be done except to open the front of the headlight and light the gas at the burner. Thereafter the apparatus requires no attention whatever until the contained carbid is exhausted, the two automatic valves responding to every demand for regulation. In case the pressure of gas at the burner is less or greater than desired the fault is corrected by adjusting the diaphragm-screw 38, which is conveniently at the top of the generator.

In some cases we enlarge the tank or well 20 beneath the lamp and employ it as a freezing-tank or gas-drying tank, which enables us to supply the marker-lamps and the cab-lamps of the locomotive by simply extending the small gas-pipes thereto from the freezing-tank 20. It is entirely safe to do this, as no gas reaches the freezing-tank except at a very low pressure and because the moisture contained in the gas is removed therefrom before it leaves the freezing-tank 20.

It is obvious that various uses and modifications of our invention will readily suggest themselves to one skilled in the art, and we therefore do not confine the invention to the specific constructions therein shown and described.

Having thus described our invention, we claim as new and desire to secure by Letters Patent—

1. A locomotive front end, in combination with a generator, a closed heat-retaining holder wherein said generator is contained, said front end being the bottom closure of said holder, an acetylene-gas burner and lamp external to said holder, and means connecting said generator and burner, substantially as described.

2. A locomotive front end, in combination with a closed heat-retaining generator-holder, whereof the top of said front end forms the bottom, a lamp mounted on said front end, a burner in said lamp and a generator connected with said burner and contained in and protected by said holder and hence heated from said front end, substantially as described.

3. A locomotive-boiler, in combination with a closed heat-retaining gas-generator holder, the lower end of said holder conforming to and being attached to the top of said boiler and said boiler forming the bottom closure of said holder whereby said holder is heated from said boiler, and means for regulating the temperature in said holder, substantially as described.

4. A locomotive-boiler, in combination with a heat-retaining generator-holder mounted on, conforming to, and being closed by a portion of said boiler to receive heat therefrom, means for varying the temperature in said holder, a generator removably arranged in said holder and a suitable lamp external to said holder, and having its burner connected with said generator, substantially as described.

5. An acetylene-gas headlight, comprising in combination with a locomotive-boiler, a closed generator-holder and a lamp erected on said boiler, means dividing said holder into upper and lower chambers, an interposed damper or regulator and a generator provided in the upper part of said holder, substantially as described.

6. In a headlight, a normally heated body, such as the front end of a locomotive-boiler, in combination with a closed heat-retaining holder mounted thereon, closed thereby and receiving heat by direct radiation therefrom, means for regulating the temperature within the upper part of said holder, an acetylene-gas-generating apparatus located in the heat-retaining holder and thereby protected from cold, a lamp having a burner, a duct connecting said generator and said burner and part of said duct being exposed to external cold, substantially as described.

7. In a headlight, a generator-holder, having heat-regulating valves or dampers at top and bottom, in combination with a lamp attached to said holder, substantially as described.

8. In a headlight, a normally heated body, such as the front end of a locomotive-boiler, in combination with a closed heat-retaining holder to receive a generator erected thereon and having heat-regulating means at top and bottom, said front end forming one wall of said closed holder, a lamp attached to said holder, a burner therein, and a gas-pipe extending from said burner into said holder, substantially as described.

9. In a headlight for locomotives, a vertical generator-holder provided with internal generator-holding guides or ribs and having a perforated floor, in combination with a damper for closing the openings of said floor and a damper-cover for said holder, substantially as described.

10. In a locomotive-headlight, the front end of a locomotive-boiler, in combination with a heat-retaining closed holder or chamber mounted on said front end to receive direct heat therefrom, said front end forming the bottom of said holder, a generator removably arranged in said holder, means within the holder interposed between said front end and said generator, for regulating the temperature of the latter, and a suitable lamp to be supplied with gas from said generator, substantially as described.

11. In a locomotive-headlight, a locomotive front end and a vertical, closed, generator-holder, having its lower end formed by said front end and adapted to receive and protect a generator from cold, in combination with a lamp attached to said holder and containing a burner, an acetylene-gas generator arranged in said holder, and means flexibly connecting said generator and burner, substantially as described.

12. The combination with the locomotive-boiler, of a gas-generator, a headlight lamp and burner, a suitable connection between said generator and lamp, a generator-holder, comprising a closed casing attached to said boiler, having one of its walls formed by said boiler, said casing having ventilating-openings, substantially as described.

13. In a locomotive-headlight, a lamp and a source of acetylene gas, including a liquid-reservoir located upon a locomotive-boiler and warmed therefrom, and a closed casing or holder inclosing said reservoir and whereof said boiler forms the bottom, substantially as described.

14. In a locomotive-headlight, the boiler front end, in combination with a vertical holder or chamber thereon, a lamp attached thereto, a burner in said lamp, a collecting pocket or well depending from said lamp and provided with a drain, a generator inclosed and protected from cold by said holder, said generator containing both water and carbid compartments, and a jointed pipe detachably connecting said collecting-pocket and generator and permitting the removal of said generator from said holder, substantially as described.

15. A locomotive front end, in combination with a closed generator-holder, having one wall formed by said front end and which is warmed by heat radiated from said front end, a gas-generator in said chamber and therein protected by the radiated heat of said front end, said chamber or holder having means for regulating the temperature of said generator, a lamp and a lamp-burner therein, connected with said generator, substantially as described.

16. A locomotive front end, in combination with a closed chamber or holder, erected on said front and having one of its walls formed thereby, a generator comprising a body having water and carbid compartments and accessory parts, said generator being removably held in said chamber and therein protected from freezing by heat radiated from that portion of said front end which forms the wall of said holder, said chamber or holder having means for regulating the temperature of said generator, a lamp and a lamp-burner connected to said generator, substantially as described.

In testimony whereof we have hereunto set our hands, this 1st day of June, 1904, at St. Paul, Ramsey county, Minnesota.

GEO. H. EMERSON.
ROBT. D. HAWKINS.
FREDERICK T. KITCHEN.

Witnesses:
W. E. JOHNSTON,
W. R. WOOD,
N. W. COONEY.